United States Patent
Li et al.

(10) Patent No.: US 12,508,156 B2
(45) Date of Patent: Dec. 30, 2025

(54) ACHIEVING UNIFORM PATTERNED DRUG RELEASE VIA AT LEAST ONE EMBEDDED MICROCHANNEL IN AN OPHTHALMIC DEVICE

(71) Applicant: Verily Life Sciences LLC, Dallas, TX (US)

(72) Inventors: Zidong Li, South San Francisco, CA (US); Christian Gutierrez, South San Francisco, CA (US)

(73) Assignee: Verily Life Sciences LLC, Dallas, TX (US)

(*) Notice: Subject to any disclaimer, the term of this patent is extended or adjusted under 35 U.S.C. 154(b) by 418 days.

(21) Appl. No.: 18/196,738

(22) Filed: May 12, 2023

(65) Prior Publication Data

US 2024/0374419 A1  Nov. 14, 2024

(51) Int. Cl.
*A61N 1/04* (2006.01)
*A61F 9/00* (2006.01)

(52) U.S. Cl.
CPC .......... *A61F 9/0017* (2013.01); *A61N 1/0448* (2013.01)

(58) Field of Classification Search
CPC ..... A61P 27/02; A61K 9/0048; A61K 9/7084; A61K 9/7061; A61K 9/7092; A61K 31/465; A61F 9/00781; A61F 9/0017; A61F 9/0008; A61F 9/007; A61F 2009/00891; A61F 2250/0067; A61F 9/00; A61F 2250/0068; A61F 9/0026; A61M 2210/0612; A61M 27/002; A61M 31/002; A61M 5/14248; A61M 2005/14252; A61M 2205/50; A61M 2205/3569; A61M 2205/3592; A61M 2205/8206; A61M 5/14244; A61M 2037/0023; A61M 2210/04; A61M 37/00; A61H 2201/165; A61H 2205/024; A61N 1/0448

See application file for complete search history.

(56) References Cited

U.S. PATENT DOCUMENTS

| | | | | |
|---|---|---|---|---|
| 5,223,262 | A * | 6/1993 | Kim | A61K 9/7092 428/447 |
| 2010/0255061 | A1 * | 10/2010 | de Juan, Jr. | A61P 27/02 604/93.01 |
| 2018/0263900 | A1 * | 9/2018 | Kim | A61K 9/5169 |
| 2020/0214887 | A1 * | 7/2020 | Gutierrez | A61K 9/0009 |

* cited by examiner

*Primary Examiner* — Nicholas J. Weiss
*Assistant Examiner* — Brandon W. Levy
(74) *Attorney, Agent, or Firm* — Haynes and Boone, LLP (57) ABSTRACT

Uniform and location patterned drug release can be achieved via microchannel(s) embedded in a drug dispensing ophthalmic device. At least one reservoir can be encapsulated within the ophthalmic device at a discrete location to hold an amount of a drug. Each reservoir can be covered by an electrode that electrodissolves to release the drug. At least one microchannel having a length and holding at least water is encapsulated in the ophthalmic device between the reservoir and the side of the ophthalmic device facing the eye. After release from the reservoir, the drug spreads through an entirety of the length of the microchannel due to a capillary force inside the microchannel and a diffusion coefficient of the drug in the water. The amount of the drug diffuses from a plurality of locations along the entirety of the length of the microchannel.

20 Claims, 8 Drawing Sheets

┌─────────────────────────────────────────────────────────────────┐
│                                                                 │
│       POSITION AN OPHTHALMIC DEVICE ON A SURFACE OF AN EYE      │
│  72                                                             │
└─────────────────────────────────────────────────────────────────┘
                                    │
                                    ▼
┌─────────────────────────────────────────────────────────────────┐
│   ACTIVATE RELEASE OF A DRUG TO AT LEAST ONE MICROCHANNEL       │
│   BY ELECTRODISSOLVING AN ELECTRODE COVERING A RESERVOIR        │
│                   WITHIN THE OPHTHALMIC DEVICE                  │
│  74                                                             │
└─────────────────────────────────────────────────────────────────┘
                                    │
                                    ▼
┌─────────────────────────────────────────────────────────────────┐
│     TREAT A DISORDER OF THE EYE IN A UNIFORM AND/OR A LOCATION  │
│     PATTERNED MANNER WHEN THE DRUG DIFFUSES FROM A              │
│    PLURALITY OF LOCATIONS ALONG AN ENTIRETY OF THE LENGTH OF    │
│                   THE MICROCHANNEL TOWARD THE EYE               │
│  76                                                             │
└─────────────────────────────────────────────────────────────────┘
```

FIG. 7

ACHIEVING UNIFORM PATTERNED DRUG RELEASE VIA AT LEAST ONE EMBEDDED MICROCHANNEL IN AN OPHTHALMIC DEVICE

TECHNICAL FIELD

The present disclosure relates to an ophthalmic device used for ocular drug delivery, and, more specifically, to systems and methods for achieving uniform and location patterned drug release via at least one microchannel embedded in a drug dispensing ophthalmic device.

BACKGROUND

The use of ophthalmic devices for ocular drug delivery is a relatively new strategy that is still being developed and improved. Drug delivery via ophthalmic devices can be active, through drug dispensing ophthalmic devices, or passive, through drug eluting ophthalmic devices. Generally, programmable drug dispensing contact lenses can store drugs in one or more reservoirs covered by an actively removable cover, such as a dissolvable electrode or polymer. Each reservoir can be thought of as a point source for releasing the drug stored therein. When the cover is removed, the drugs in the reservoir can be released into the body of the ophthalmic device to axially diffuse to the eye for treatment. Generally, once a drug is released from a reservoir the drug diffuses to a larger degree in the axial direction, toward the eye, than in the lateral direction, through the body of the ophthalmic device, based on properties of the body of the ophthalmic device. This can cause treatment to be heavily localized to an area near the reservoir. Heavily localized treatments may be undesirable in certain applications. Some passive drug eluting ophthalmic devices provide more lateral drug sources, but the drug release is not actively controllable. The drug eluting ophthalmic devices can be soaked in a given drug so that the entire device body releases the drug for a more uniform treatment application. However, this technique allows for only continuous, passive drug release of a single drug, with no active control.

SUMMARY

Thus, there is a need for an ophthalmic device that can actively control drug release in a uniform and location patterned manner. Described herein are systems and methods for achieving uniform and location patterned drug release via microchannels embedded in a drug dispensing ophthalmic device. The systems and methods described herein provide actively controlled drug delivery while allowing the drug to be released from a plurality of different locations in the microchannels.

In one aspect, the present disclosure includes a system that can achieve uniform and location patterned drug release via at least one microchannel embedded in the drug dispensing ophthalmic device. The ophthalmic device can be configured to be positioned on a surface of an eye. The ophthalmic device can include a body, a side facing the eye, and an outward facing side. At least one reservoir can be encapsulated within the body of the ophthalmic device at a discrete location and configured to hold an amount of a drug. Each of the at least one reservoir can be covered by an electrode configured to electrodissolve, wherein the amount of the drug is released from the at least one reservoir when the electrode electrodissolves. At least one microchannel having a length and holding at least water can be encapsulated in the ophthalmic device between the at least one reservoir and the side of the ophthalmic device facing the eye. The at least one microchannel can be configured to receive the amount of the drug after the amount of the drug is released from the at least one reservoir. The amount of the drug spreads through an entirety of the length of the microchannel due to a capillary force inside the microchannel and a diffusion coefficient of the drug in the water before the amount of the drug diffuses out of the ophthalmic device to the eye. The amount of the drug diffuses from a plurality of locations along the entirety of the length of the microchannel.

In another aspect, the present disclosure includes a method for achieving uniform and location patterned drug release via at least one microchannel embedded in the drug dispensing ophthalmic device. The method can include positioning an ophthalmic device on a surface of an eye. The ophthalmic device can include a body, an eye facing side, and an outward facing side. The body can encapsulate: a reservoir, at a discrete location, that is covered by an electrode and configured to hold an amount of a drug, and at least one microchannel that has a length and holds water, wherein the at least one microchannel is encapsulated in the ophthalmic device between the at least one reservoir and the side of the ophthalmic device facing the eye. The method can also include activating release of the amount of the drug by electrodissolving the electrode. The amount of the drug can enter the at least one microchannel upon release from the reservoir and spread through an entirety of the length of the microchannel due to a capillary force inside the microchannel and a diffusion coefficient of the drug in the water. The method can also include treating a disorder of the eye in a uniform and/or a location patterned manner when the amount of the drug diffuses from a plurality of locations along the entirety of the length of the at least one microchannel toward the eye.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

I. Definitions

Unless otherwise defined, all technical terms used herein have the same meaning as commonly understood by one of ordinary skill in the art to which the present disclosure pertains.

As used herein, the singular forms "a," "an," and "the" can also include the plural forms, unless the context clearly indicates otherwise.

As used herein, the terms "comprises" and/or "comprising," can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

As used herein, the terms "first," "second," etc. should not limit the elements being described by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, the term "ophthalmic device" refers to a medical instrument used on or within a portion of a patient's eye for optometry or ophthalmology purposes (e.g., for diagnosis, surgery, vision correction, disorder treatment, or the like). An ophthalmic device can include one or more components that facilitate one or more active processes for purposes other than vision (e.g., pharmaceutical release). Generally, the ophthalmic device can have a three-dimensional (3D) shape with at least a perimeter and a depth (thickness measured from a front (eye facing) side and a back (outward facing) side). The ophthalmic device can be configured to dispense drugs (e.g., at least with a reservoir holding one or more drugs covered by an electrode for electrodissolution to free the one or more drugs). An example of an ophthalmic device that facilitates pharmaceutical release can be referred to as a "drug dispensing contact lens".

As used herein, the term "reservoir" refers to a storehouse for a drug (e.g., a volume or an amount of the drug) with a portion having an opening for release of the drug. The opening may be covered with an electrode or another substance to prevent release of the drug. In some instances, the covering can facilitate release of the drug from the reservoir. For example, at least a portion of the covering can be an electrode that can electrodissolve to facilitate the release of the drug.

As used herein, the term "drug" refers to one or more substance (e.g., liquid, solid, or gas) related to the treatment, symptom relief, or palliative care of a disease, disorder, injury, or other malady. For example, the drug can be a pharmaceutical, saline solution, over the counter eye drops, or the like. The term "drug" can be used interchangeably with the terms "therapeutic" and "pharmaceutical".

As used herein, the term "electrode" refers to a conductive solid (e.g., including one or more metals, one or more polymers, or the like) that receives/transmits an electrical signal. For example, the electrode can be the working electrode (e.g., a gold electrode that may be a thin film) of a 2-electrode system and/or a 3-electrode system.

As used herein, the term "electrodissolution" refers to a process for dissolving a solute using an electrical catalyst. In one non-limiting example, application of an electrical signal to a solid metal can cause the solid metal to electrodissolve into separate molecules.

As used herein, the term "encapsulate" refers to fully enclosing an object within something else. For example, a reservoir can be encapsulated within an ophthalmic device.

As used herein, the term "diffusion" refers to the movement of a substance (e.g., a drug) from an area of higher concentration to an area of lower concentration. The rate at which diffusion occurs can depend on factors, such as the temperature, viscosity of the substance, the concentration gradient, the amount of surface area available for diffusion, and the distance particles of the substance must travel. For example, when a drug is released from a reservoir in an ophthalmic device, the drug tends to diffuse in an axial direction (toward the eye) at a significantly greater rate than in a lateral direction (through the body of the ophthalmic device, such as a contact lens).

As used herein, the term "microchannel" refers to a channel with a hydraulic diameter less than 1 mm (e.g., 1 µm-99 µm) and high surface area to volume ratio. A microchannel can be used to distribute a drug laterally within a body of an ophthalmic device before the drug diffuses to the eye (e.g., to reach more of the breadth of a body of an ophthalmic device).

As used herein, the term "capillary force" refers to the forces utilized in the process of a liquid flowing in a narrow space without the assistance of, or even opposition to, any external forces such as gravity. Capillary force can include the intermolecular forces between the liquid and surrounding solid surface that propel the liquid, predominantly the combination of surface tension of the liquid and adhesive forces between the liquid and the wall of the narrow space.

As used herein, the terms "patient", "subject", "user", and the like can be used interchangeably and can refer to an animal (e.g., a human) suffering from a condition that can be treated with a drug dispensing ophthalmic device.

II. Overview

Efficient ocular drug delivery has long been a challenge for the medical community at least due to the low bioavailability (the ability of a drug to be absorbed and used by the patient's body) of certain drugs with ophthalmic uses when delivered in conventional forms (e.g., eyedrops, ointments, and the like) and generally low patient compliance. To increase patient compliance and bioavailability of certain drugs, ophthalmic devices (e.g., contact lenses, etc.) have been investigated for drug delivery applications directly to the eye. Two main types of ophthalmic devices that can be positioned on the ocular surface have been developed. First, active drug dispensing contact lenses that currently generally suffer from heavily localized and less effective or ineffective treatments. And second, passive drug eluting ophthalmic devices that provide a wider passive drug release but suffer from no means of active control of drug release. Thus, there is a need for an ophthalmic device that can actively control drug release in a uniform and location patterned manner.

Described herein are systems and methods for achieving actively controlled uniform and location patterned drug release via microchannels embedded in a drug dispensing ophthalmic device. The drug release can be active, triggered by application of an electrical signal to electrodissolve an electrode covering a reservoir storing the drug, and can also be uniform and location patterned, as the microchannels facilitate the lateral diffusion of the drug throughout the body of the ophthalmic device prior to axial diffusion to the eye. This is possible due to the microchannels being encapsulated in the body of the ophthalmic device between the reservoir and a side of the ophthalmic device facing the eye. After receiving the drug from the reservoir, the drug can spread through the microchannels due to at least a capillary force inside the microchannel and a diffusion coefficient of the drug in water, held in the microchannels, before the drug diffuses out of the ophthalmic device to the eye. Thus, the drug diffuses from a plurality of locations along the entirety of the length of the microchannel, rather than the point nearest the reservoir itself, increasing the uniformity and patterned release of the drug.

III. System

Provided herein is an ophthalmic device including one or more microchannels that can actively dispense one or more drugs to an eye of a patient in a uniform and/or patterned manner. Current active drug dispensing ophthalmic device only dispense drug(s) to a portion of the eye closest to a drug reservoir of the ophthalmic device from which the drug is dispensed. However, once dispensed to the eye some drugs cannot spread to the entire desired treatment area of the eye and thus can only treat a small subsection of the desired treatment area. As such, there is a significant need in the industry for an ophthalmic device that can actively control drug release in a uniform and/or location patterned manner. For example, there is a need for an ophthalmic device that can treat disorders (or symptoms) of the eye, such as glaucoma, dry eye, macular degeneration, retinopathy, or the like, in a uniform and/or location patterned manner.

Figure 1:
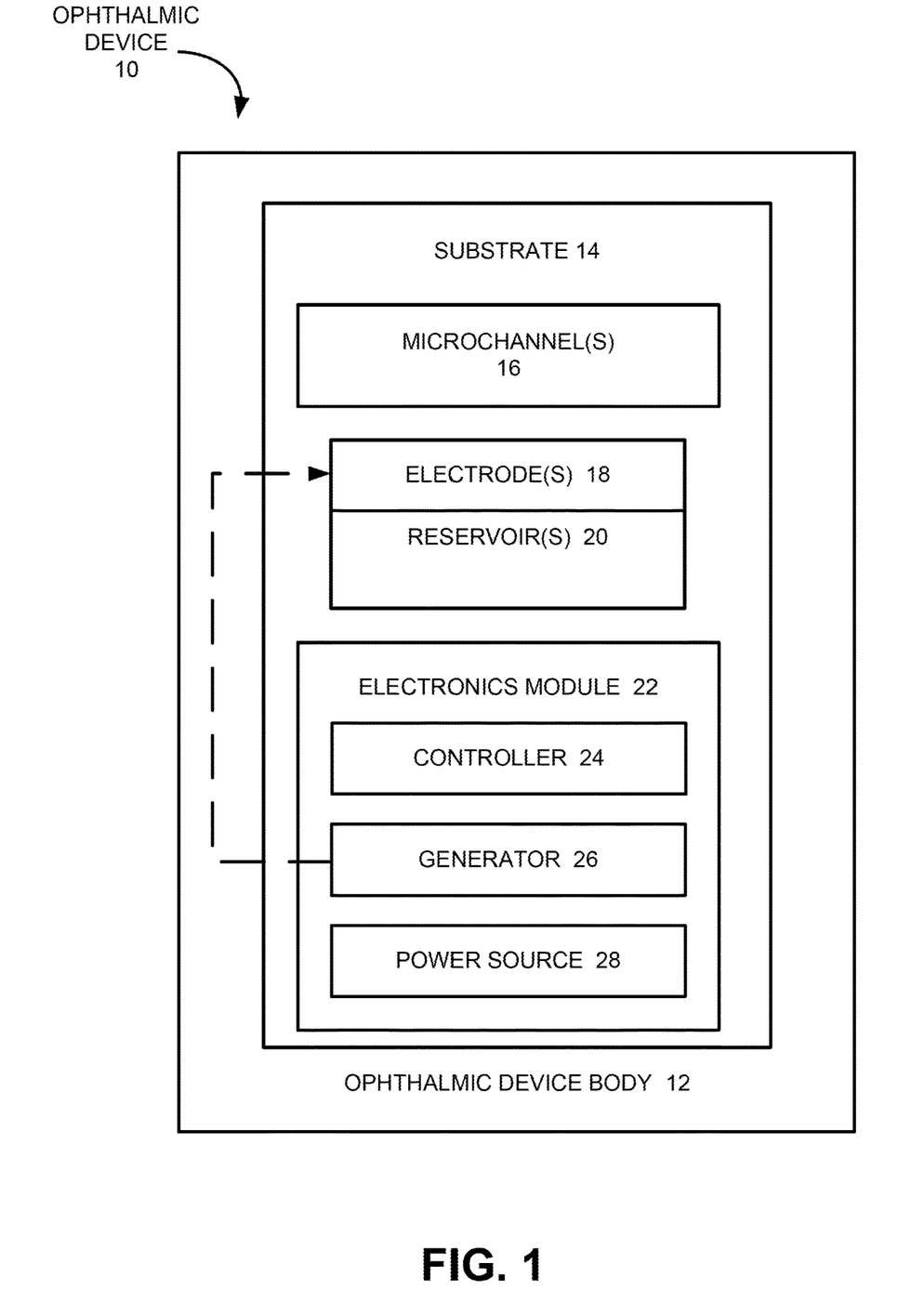
FIG. 1 is a diagram of an ophthalmic device including at least one microchannel.

FIG. 1 shows a block diagram of an ophthalmic device 10 that can actively dispense one or more drugs to the eye of a patient in a uniform and/or patterned manner. The ophthalmic device 10 can have a body 12 that can encapsulate a substrate 14. The substrate 14 can at least partially include one or more microchannels (microchannel(s)) 16), one or more drug wells, each comprising an electrode 18 covering an opening of a reservoir 20, and an electronics module 22. The one or more microchannels can be patterned on the substrate 14 to at least partially overlap each of the electrode(s) 18 covering the openings of the reservoir(s) 20. The electronics module 22 can communicate with outside devices (e.g., having a wireless communication transmitter, receiver, and/or transceiver) and can also include components required to control and facilitate the release of the drug from the reservoir. The electronics module 22 can include, but is not limited to, a controller 24, a signal generator (generator 26), a power source 28, and circuitry for connecting one or more of the elements. The generator 26 can send an electrical signal to one or more of the electrode(s) 18 to begin electrodissolution of the electrode(s) to release the drug stored within the given reservoir(s) 20.

The ophthalmic device 10 can be positioned on a surface of an eye (e.g., can be a contact lens). The ophthalmic device 10 can have a body 12 that encapsulates the substrate 14 and all of the elements at least partially positioned on and/or in and/or patterned thereon (e.g., the electrode(s) 18, the reservoir(s) 20, the electronics module 22, circuitry, etc.) and can have a side facing the eye and an outward facing side (e.g., with a contact lens the concave side is the eye facing side and the convex side is the outward facing side). As an example, the body 12 can include a hydrogel-based material. For example, the body 12 can be made of a soft, flexible, biocompatible material suitable/safe for optical wear, such as a polymeric material like polymethyl methacrylate (PMMA), polyhydroxyethylmethacrylate (polyHEMA), silicone hydrogel, silicon-based polymer(s) like fluoro-silicon acrylate, silicone elastomer, combinations thereof, or the like. Additionally, while shown as a single substrate 14, the substrate can include one or more substrates of a same material and/or of different materials. The substrate 14 (or each of the substrates) can be one or more polymer substrates. In some instances, at least a portion of the substrate 14 (or the substrates) can be biocompatible (or at least non-immunogenic when used against the outside of the eye).

The ophthalmic device 10 can include at least one drug well, often more than one, where each drug well can include a reservoir (reservoir(s) 20) that can have a given volume and can store at least one drug (in an amount determined by a medical professional) therein. Each of the at least one reservoir (reservoir(s) 20) encapsulated within the body 12 of the ophthalmic device 10 can be positioned at a discrete location within the ophthalmic device body. For example, the substrate 14 can be configured as an annular ring, so as to not block the vision of a user of the ophthalmic device 10 and each of the at least one reservoir (reservoir(s) 20) can be located at a position at least partially on and/or in the substrate. Each of the at least one reservoir (reservoir(s) 20) can have a volume (each of which can be the same and/or different from another) and can hold an amount of a drug therein. Each of the at least one reservoir (reservoir(s) 20) can have an opening (positioned toward the eye facing side of the ophthalmic device 10) covered by an electrode (electrode(s) 18). The electrode(s) 18 can be, for example, a thin metal film electrode such as a gold electrode. The electrode(s) 18 can electrodissolve upon receiving an appropriate electrical signal from the generator 26. As each of the electrode(s) 18 electrodissolves, the amount of the drug stored in the respective reservoir (of reservoir(s) 20) associated with the electrode can then be released from the reservoir. It should be noted that the electrodes can electrodissolved individually, or a plurality of electrodes may be electrodissolved simultaneously if the electrical signal is sent to the more than one electrode.

Advantageously compared to traditional drug dispensing ophthalmic devices, the ophthalmic device 10 can include at least one microchannel (microchannel(s) 16) encapsulated in the ophthalmic device 10 (inside the body 12) between the at least one reservoir (reservoir(s) 20) and the side of the ophthalmic device facing the eye, allowing for drug delivery in a uniform and/or patterned manner. For example, the at least one microchannel (microchannel(s) 16) can be patterned on the substrate 14 (on the eye facing side) and at least partially over each of the electrode(s) 18 covering the reservoir(s) 20. Each of the at least one microchannel (microchannel(s) 16) can have a length, a width, and a depth and can hold at least water ($H_2O$). Each of the at least one microchannel (microchannel(s) 16) can receive the drug (in the amount stored in the reservoir(s) 20) after the drug is released from the at least one reservoir (e.g., the drug diffuses into the microchannels patterned above the opening of the reservoir(s) that are uncovered by electrodissolving the electrode(s) 18; a capillary force causes the drug to enter the microchannel). The drug (in the amount) can spread through an entirety of the length of the at least one microchannel (microchannel(s) 16) in the water (virtually immediately due to the capillary force) before the drug diffuses out of the body 12 of the ophthalmic device 10 to the eye. The drug can spread through the entirety of the length of the microchannel(s) 16 before diffusing to the eye at least partially due to the capillary force inside the microchannel(s) and a diffusion coefficient of the drug in the microchannel and/or the water in the microchannel being stronger than the diffusive forces of the body 12 of the ophthalmic device 10. The capillary force inside the at least one microchannel (microchannel(s) 16) can pull the drug into the at least one microchannel and can spread the drug across the length and/or width of the at least one microchannel. The amount of the drug can then diffuse from a plurality of locations along the entirety of the length of the at least one microchannel (microchannel(s) 16) out of the body 12 of the ophthalmic device 10 towards the eye to treat a disorder, disease, or symptom of the eye. The drug can diffuse from the plurality of locations uniformly or non-uniformly from the entirety of the length of the at least one microchannel (microchannel(s) 16).

Figure 2:
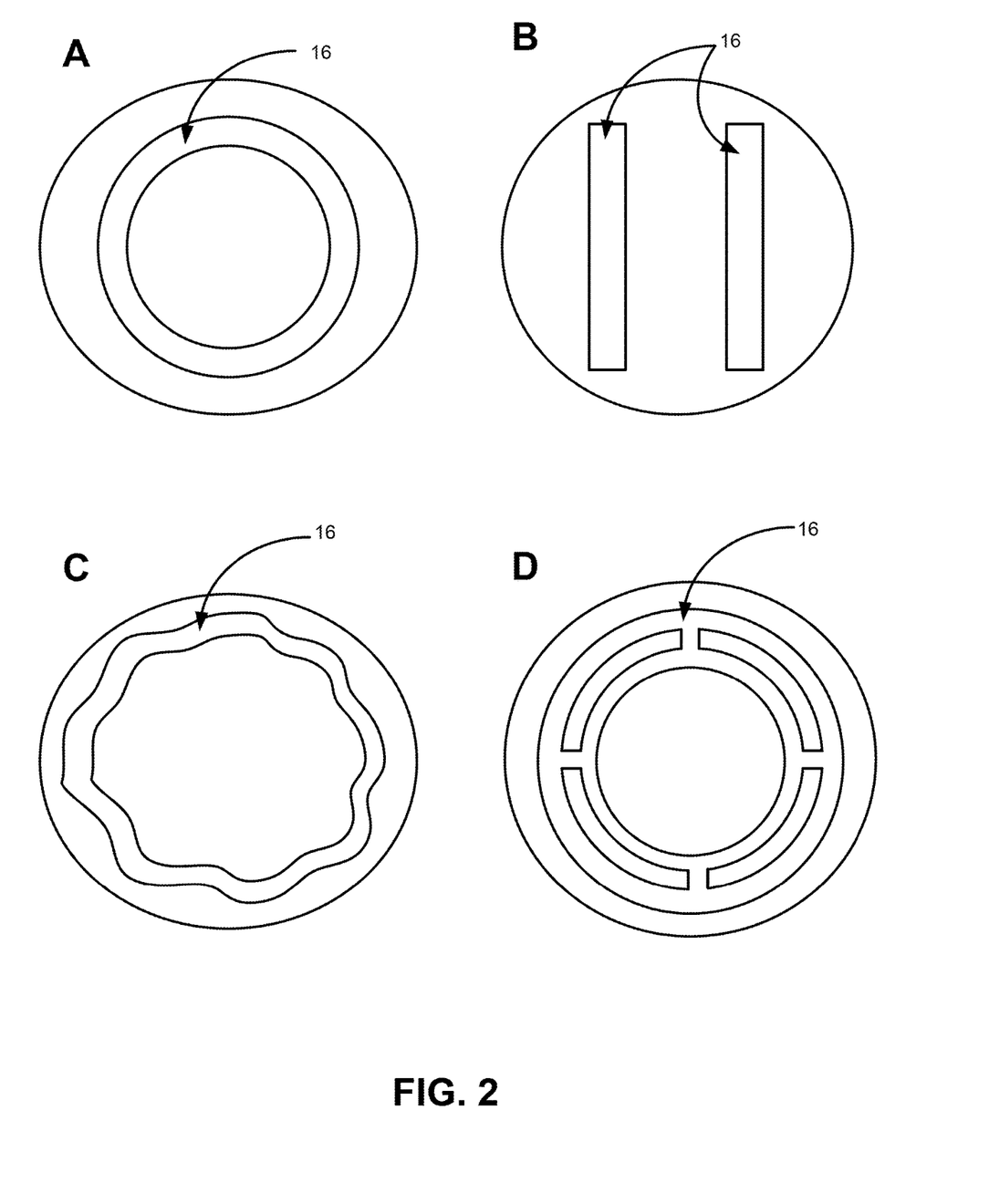
FIG. 2 includes top view illustrations of example configurations of microchannel(s)

The at least one microchannel (microchannels(s) 16) can have any shape and/or design to facilitate uniform and/or patterned active drug dispensing to the eye. The at least one microchannel (microchannel(s) 16) can extend in a lateral direction inside the body 12 of the ophthalmic device 10. The at least one microchannel (microchannels(s) 16) can also be positioned within the ophthalmic device such that the amount of the drug diffuses to the eye in a predetermined pattern from the plurality of locations along the length of the entirety of the at least one microchannel. FIG. 2 shows illustrations of possible two-dimensional shapes for microchannel(s) 16 within an ophthalmic device having an elliptical top view (with other components not shown). It should be understood that the microchannel(s) 16 are three-dimensional but are illustrated in two dimensions for ease of explanation. FIG. 2, Element A shows a single ring shaped microchannel 16, but could include any number of concentric or non-concentric ring microchannels, where each ring microchannel is positioned over at least one reservoir (e.g., positioned between the electrode covering the reservoir and the eye). For example, the at least one microchannel 16 can be positioned to extend near and around the elliptical perimeter as shown. FIG. 2, Element B shows two microchannels 16 (but could be any number one or more) that have a rectangular shape, where each rectangular microchannel is positioned over at least one reservoir (e.g., positioned between the electrode covering the reservoir and the eye). The rectangular microchannels 16 can have any length and/or width and can be positioned at any angle relative to one another (e.g., parallel as shown, perpendicular, 45-degree angle etc.) and may or may not intersect. FIG. 2, Elements C and D show different examples of irregularly shaped microchannel(s) 16.

Figure 3:
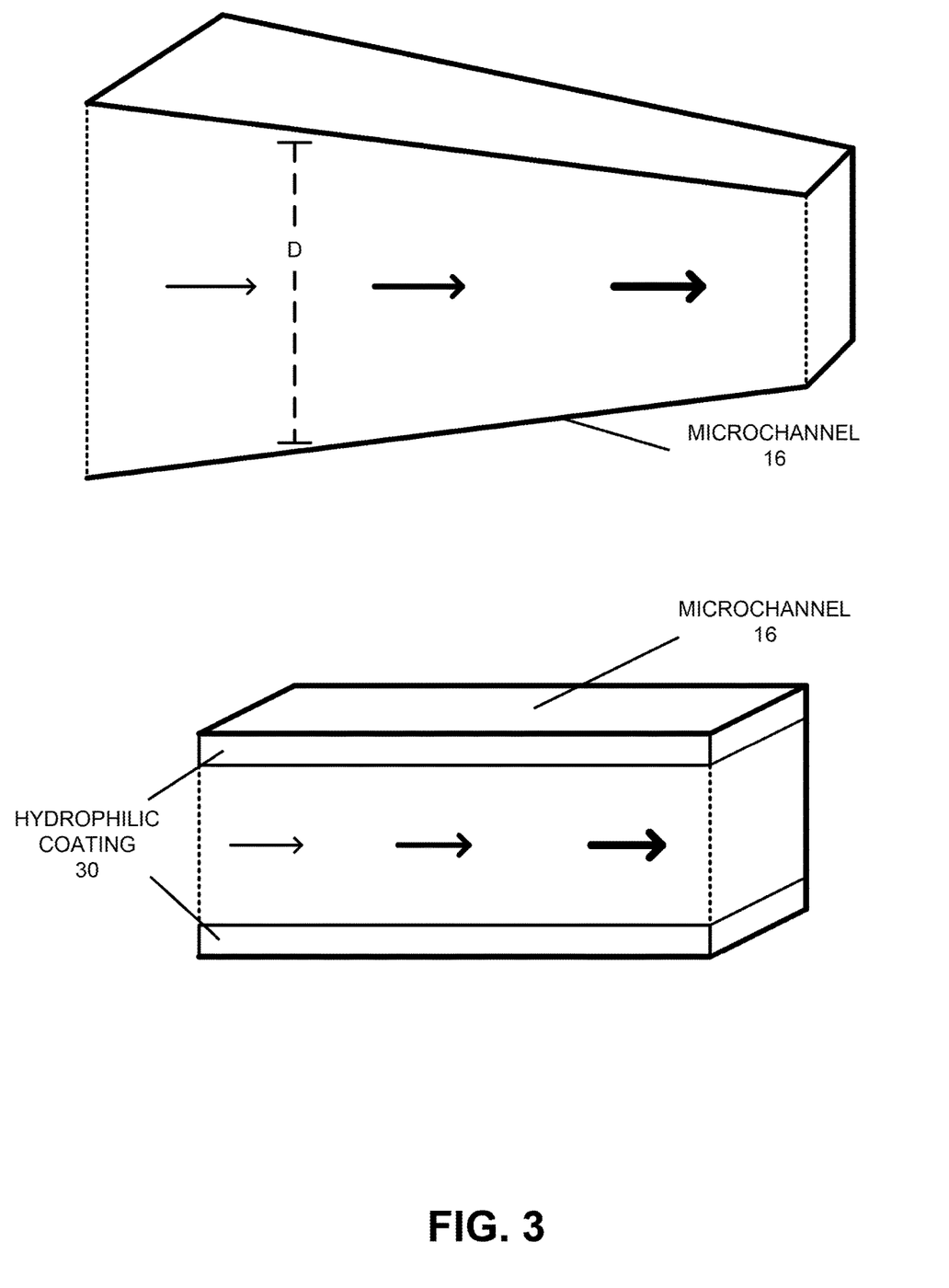
FIG. 3 includes perspective view illustrations of example layouts of the microchannel(s) of FIG. 1.

After release from the reservoir(s) 20 the drug can spread through the entirety of the length of the microchannel(s) 16 before diffusing to the eye. The drug can spread through the entirety of the length of the microchannel(s) 16 before diffusing out of the body 12 of the ophthalmic device 10 to the eye because of capillary force inside the microchannel(s) and a diffusion coefficient of the drug in the microchannel(s) and the water in the microchannels being stronger than the diffusive forces of the body 12 of the ophthalmic device 10. The capillary force inside the at least one microchannel (microchannel(s) 16) can pull the drug into the at least one microchannel and can spread the drug across the length and/or width of the at least one microchannel. The capillary force inside the at least one microchannel (microchannel(s) 16) can be created by gradually decreasing the width and depth of the microchannel (as shown in the top of FIG. 3, where D shows the depth changing and the arrows show the direction of flow of the drug in the microchannel). The at least one microchannel (microchannel(s) 16) can also or alternatively include a hydrophilic coating 30 (shown in the bottom of FIG. 3, where the arrows show the direction of the flow of the drug in the microchannel). The hydrophilic coating 30 can be gradually changed (e.g., different levels of hydrophilicity, increase/decreases the width and depth of coating, etc.) to create the capillary force inside the microchannel. It should be understood that these are only examples and any other methods for forming the capillary force inside a microchannel can be used. The drug can also be pulled into and spread through the at least one microchannel (microchannel(s) 16) because the rate of diffusion of the amount of the drug in the water held in the at least one microchannel can be at least 100 times faster than a rate of diffusion of the amount of the drug in the body 12 of the ophthalmic device 10.

Figure 4:
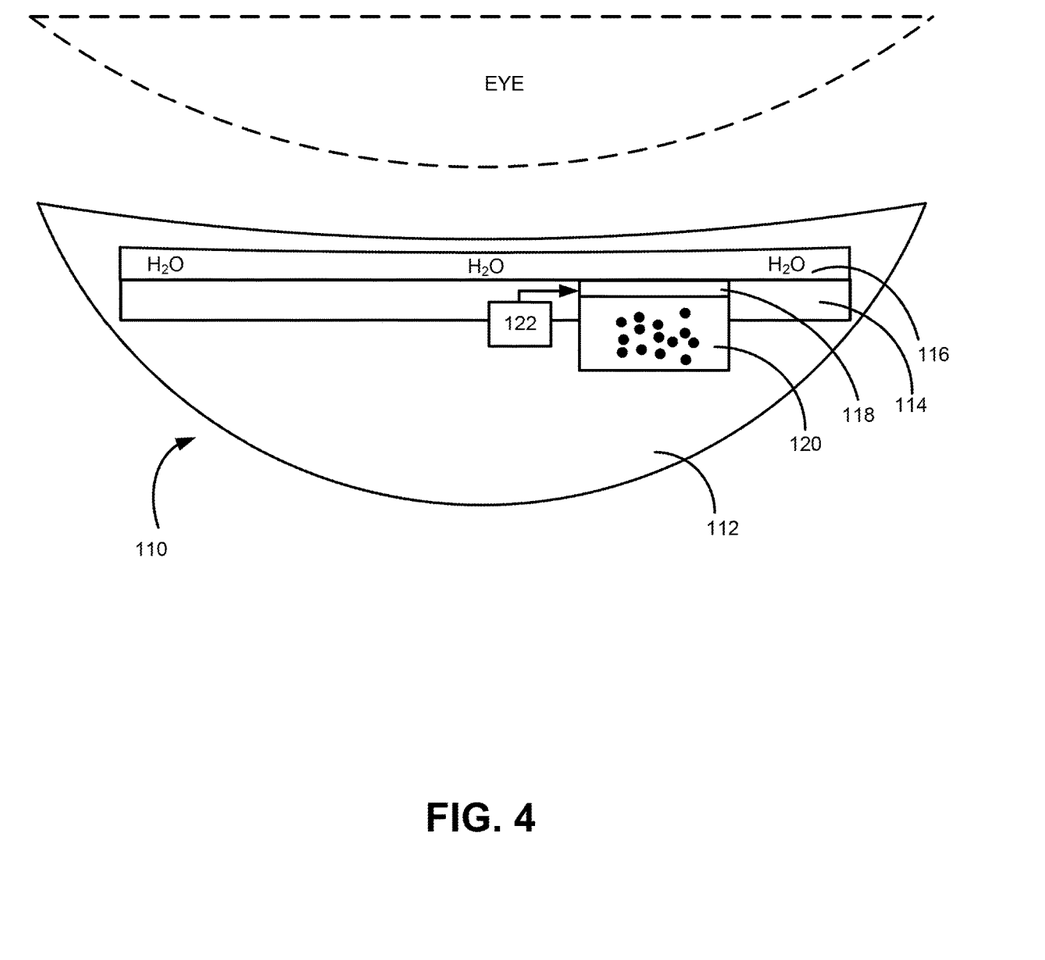
FIG. 4 is a side view illustration of a drug dispensing contact lens, an example of the ophthalmic device of FIG. 1.

Referring now to FIG. 4, a simplified illustration of an example ophthalmic device that is a contact lens 110 (placement relative to a cartoon eye is shown, space is shown between the contact lens 110 and the eye but they can be at least partially in direct contact). The contact lens 110 can have a body that includes a hydrogel-based material and can encapsulate the substrate 114, the microchannel 116, the drug reservoir 18 having electrode 120, and the electronics module 122. When worn by a user, the contact lens 110 can be positioned on the surface of the eye such that one side (shown as the concave side) faces the eye, and the other side (shown as the convex side) faces outward. The microchannel 116 (shown as a single microchannel for ease of illustration and description only) can be positioned near an edge of the body 112 of the contact lens 110 on the eye facing side and between the eye facing side and the reservoir 120. More particularly the microchannel 116 can be positioned (e.g., patterned) on the substrate 114 at least partially over the electrode 118 covering an opening to the reservoir 120. The reservoir 120 can have a volume and can be configured to store an amount of a drug (shown as black circles). In other examples a single reservoir can be configured to store more than one drug. The reservoir 120 can be positioned at a discrete location in the contact lens 110. The reservoir 120 can be at least partially in the substrate 114, for example the reservoir 120 can be formed into the substrate and of the same material as the substrate (such as SU8, for example). It should be noted that the reservoir 120 and the electronics module 122 are both shown as extending from the substrate 114, but the reservoir 120 and the electronics module 122 need not be positioned in this way. The electronics module 122 can be positioned on any portion of the substrate 114 and in any manner known in the art. The electronics module 122 is shown as a single module, but it should be understood that the electronics module 122 can also be embodied as the separate components described therein and connected by circuitry on the substrate 114. The electronics module 122, particularly the signal generator can be in electrical communication with the electrode 118.

Figure 5:
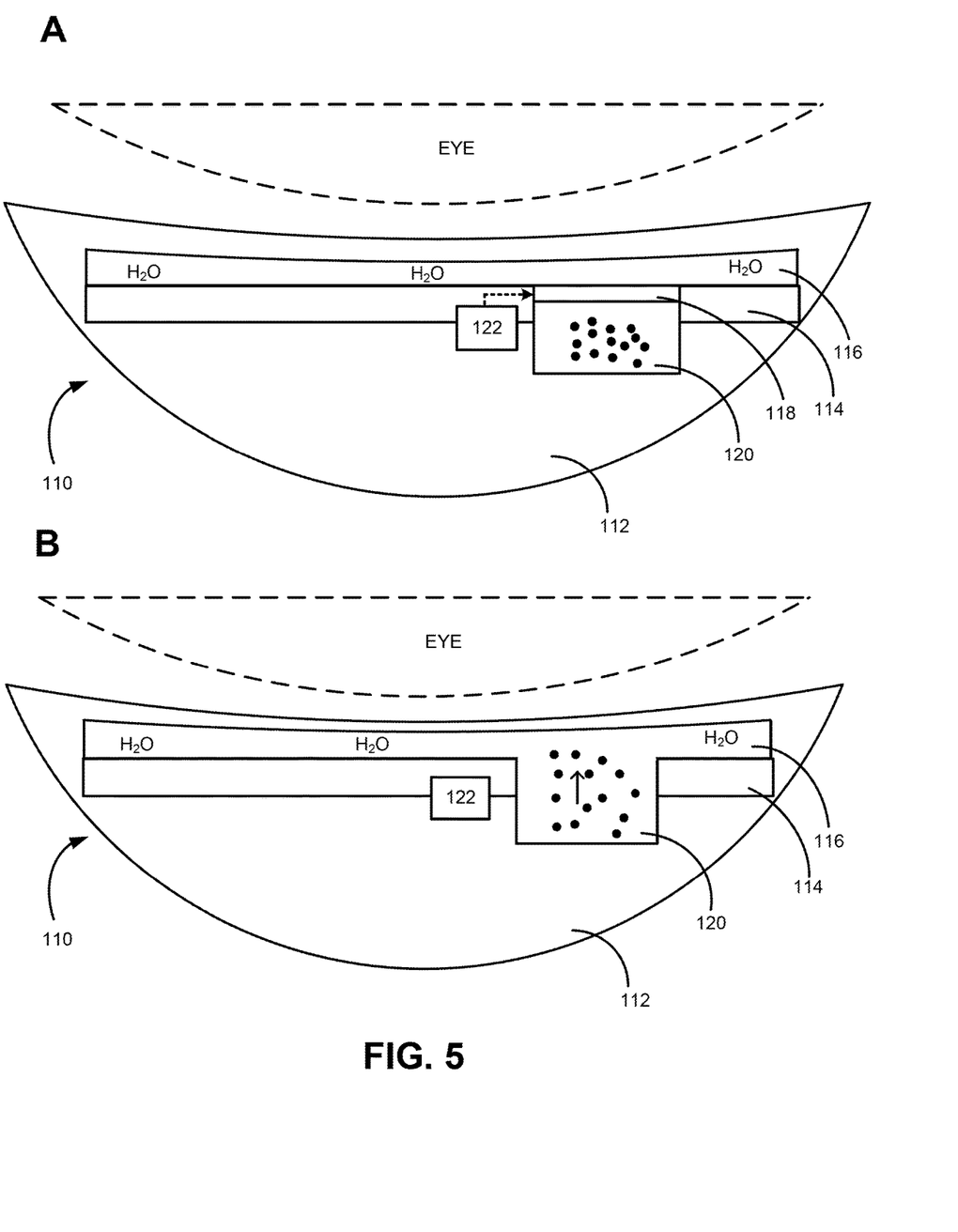
FIG. 5 includes side view illustrations showing the drug dispensing contact lens of FIG. 4 in use.

FIG. 5, shows simplified side views of contact lens 110 in use to actively deliver a drug to the eye of the user in a uniform and/or location patterned manner. The illustrated contact lens 110 is only an example and other configurations, including, but not limited to, more than one drug well and different shapes, sizes and configurations of drug well(s) (including both reservoir 120 and electrode 118), substrate 114 and/or microchannel 116. As shown, the contact lens 110 includes a body 112 encompassing the microchannel 116, holding at least water ($H_2O$), that is patterned on top of (e.g., nearer the eye surface when worn) the substrate 114 over at least a portion of the electrode 118. The electronics module 122 is in electrical communication (shown by the arrow with the dotted line) with the electrode 118 covering the reservoir 120 and the drug (shown as circles) stored in the reservoir before active delivery begins. FIG. 5, Element A illustrates the electrode 118 receiving an electrical signal (of a given voltage) for a predetermined amount of time from the signal generator (not shown) of the electronics module 122. The electrical signal can be automatically (e.g., based on a pre-determined schedule or in response to feedback from a sensor) or manually activated through the electronics module 122 and/or an external device (not shown) in communication with the electronics module. The electrical signal initiates electrodissolution of the electrode 118. Once the electrode 118 has at least partially dissolved, the interior of the reservoir 120 and the interior of the microchannel 116 are in fluid communication.

As shown in FIG. 5, Element B, once electrode 118 at least partially dissolves (shown fully dissolved) the interiors of the reservoir 120 and the microchannel 116 are in fluid communication and the drug (circles) diffuses into the microchannel. Capillary forces inside the microchannel 116 and/or the diffusion coefficient of the drug in the water ($H_2O$) in the microchannel can facilitate the diffusion of the drug into the microchannel. Once the drug enters the microchannel 116 the drug spreads through the entirety of the length of the microchannel, as shown in FIG. 5, Element C, due to the capillary force inside the microchannel and a diffusion coefficient of the drug in the water before the drug diffuses out of the contact lens 110 to the eye. The rate of diffusion of the drug in the water of the microchannel 116 is at least 100 times faster than the rate of diffusion of the drug in the body 112 of the contact lens 110. Thus, after the drug is spread throughout the microchannel 116 (in a uniform and/or near uniform manner) then the drug diffuses out of the microchannel in the direction of the eye, as shown in FIG. 5, Element D. The drug diffuses from a plurality of locations along the entirety of the length of the microchannel 116 towards the eye in a uniform and/or patterned manner based on the configuration (e.g., shape, size, depth, materials, etc.) of the microchannel. The drug is shown diffusing from the microchannel 116 towards the eye through a (comparatively) thin portion of the contact lens 110 body 112. The drug diffuses towards the eye rather than in other directions into the body 112 of the contact lens due at least in part to the difference between the diffusion coefficient towards the eye and the tears of the eye versus the rest of the body 112.

Figure 6:
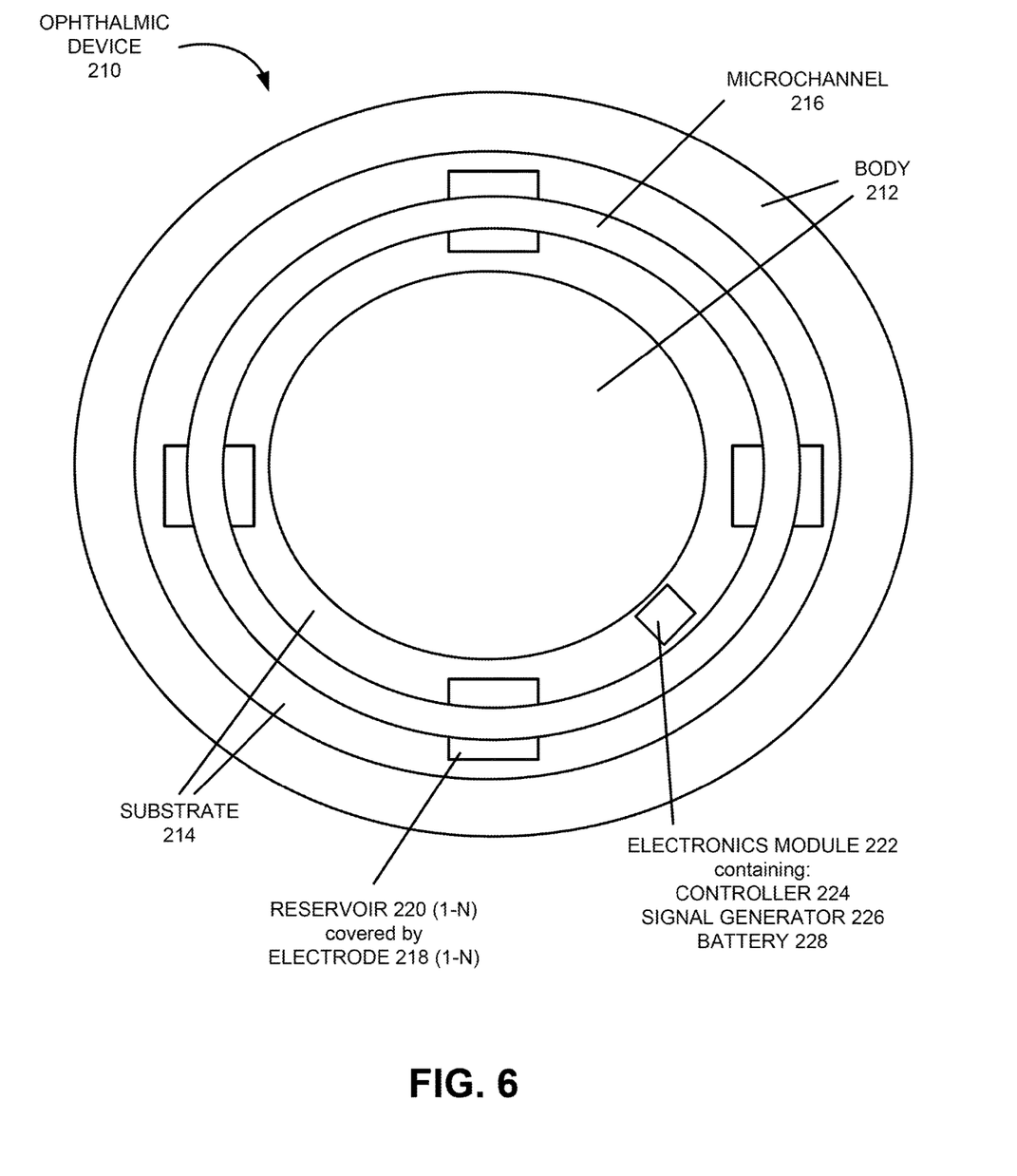
FIG. 6 is an illustration of a top view of an example ophthalmic device of FIG. 1.

FIG. 6 shows a top view illustration of an example ophthalmic device 210, which can be a contact lens. In this example ophthalmic device 210 the substrate 214 and the microchannel 216 are concentric rings with the microchannel 216 patterned on top of a portion of the substrate 214. The microchannel 216 and the substrate 214 are encapsulated within the body 212 of the ophthalmic device 210. The area of the body 212 of the ophthalmic device 210 is kept free of electronic and drug delivery components so as to not impede the vision of a user when the ophthalmic device is worn. The substrate 214 is shown including four drug wells, but any number one or more can be included, made of a electrodes 218 (1-N) covering reservoirs 220 (1-N) storing one or more drugs. The substrate can 214 is also shown including electronics module 222 that can include, but is not limited to, a controller 224, a signal generator 226, and a battery 228. Other electronic components such as circuitry, wireless receivers, transmitters, transceivers, or the like can also be included, but are not shown for simplicity of illustration. The electronics module 222 can be in electrical communication with each of the electrodes 218 (1-N). Example ophthalmic device 210 can facilitate multiple active drug dispensing events in a uniform and/or patterned manner as the microchannel 216 is patterned above at least a portion of each of the electrodes 218 (1-N). It should be understood that example ophthalmic device 210 is only one example and other configurations, shapes, and numbers of components can be understood from this example.

IV. Method

Another aspect of the present disclosure can include example method 70 (shown in FIG. 7) using an ophthalmic device including at least one microchannel for active drug dispensing (examples of which are shown in FIGS. 1-6). The method 70 is illustrated as a process flow diagram with flow chart illustrations that can be implemented by the ophthalmic devices 10, 110, and/or 210 shown in FIGS. 1-6 for example.

For purposes of simplicity, the method 70 is shown and described as being executed serially; however, it is to be understood and appreciated that the present disclosure is not limited by the illustrated order as some steps could occur in different orders and/or concurrently with other steps shown and described herein. Moreover, not all illustrated aspects may be required to implement the method 70. It should be noted that one or more steps of the method 70 can be executed by a hardware processor.

Figure 7:
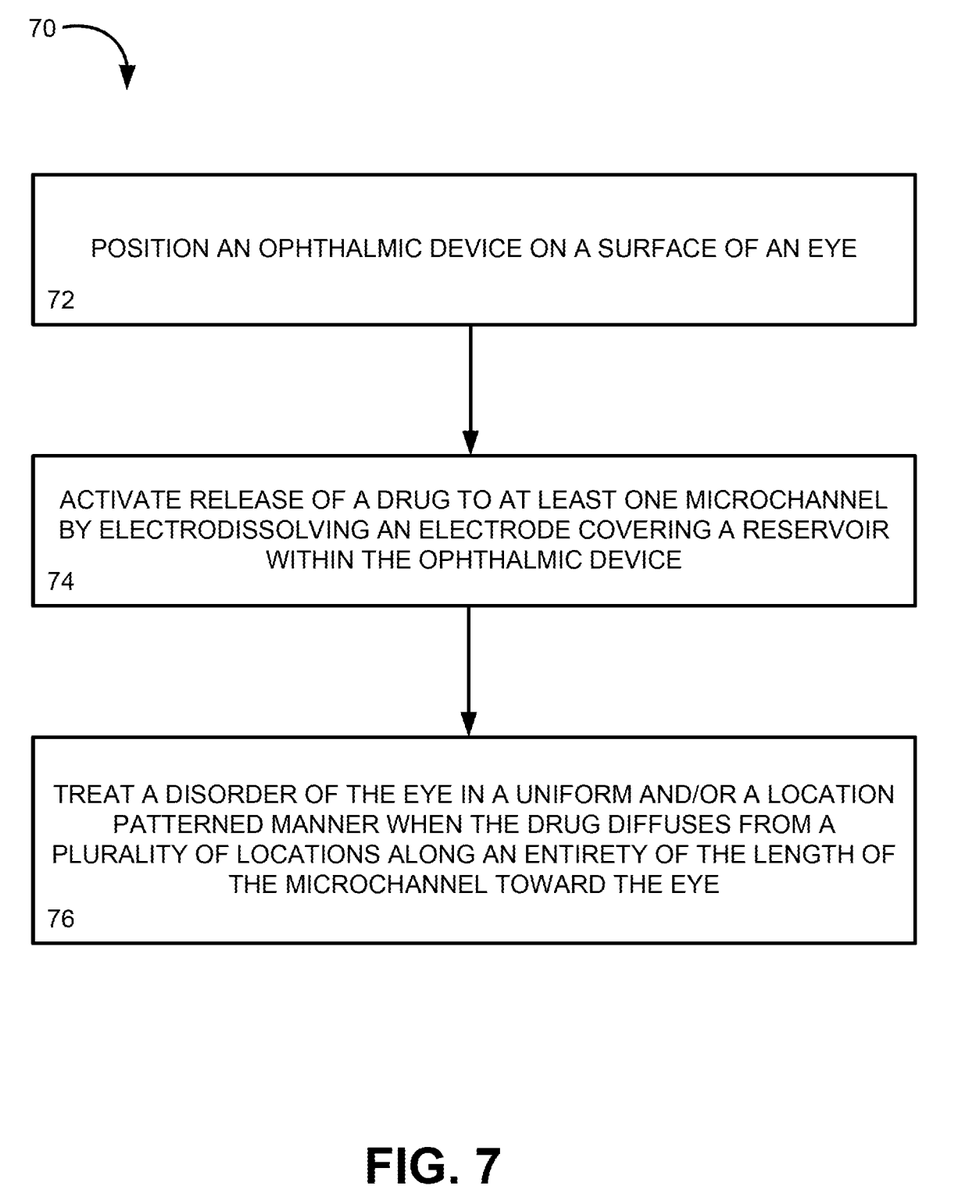
FIG. 7 is a process flow diagram of a method for using the ophthalmic device of FIG. 1.

FIG. 7 shows a method 70 for using an active drug dispensing ophthalmic device including at least one microchannel to actively dispense a drug to an eye of a user wearing the device to treat a disorder of the eye in a uniform and/or location patterned manner. At 72, the ophthalmic device, which can be an active drug dispensing contact lens, can be positioned on a surface of the eye of the user. The ophthalmic device can include a body, an eye facing side, and an outward facing side. The body of the ophthalmic device can encapsulate a reservoir, at a discrete location, that is covered by an electrode and configured to hold an amount of a drug. In other examples, the body of the ophthalmic device can encapsulate a plurality of reservoirs, each of the plurality of reservoirs can be at a unique location and each can hold an amount of a drug and be covered by an electrode. The body of the ophthalmic device can also encapsulate at least one microchannel that has a length and holds water. The at least one microchannel can be encapsulated in the ophthalmic device between the at least one reservoir and the side of the ophthalmic device facing the eye.

At 74, release of the amount of the drug (from each of the at least one reservoir) can be activated by electrodissolving the electrode covering the reservoir storing the amount of the drug. Activating the release of the amount of the drug from the at least one reservoir can include sending an electrical signal to the electrode covering the at least one reservoir. Application of the electrical signal to the electrode (at a given voltage) can begin electrodissolution of the electrode, and continued application over time can fully dissolve the electrode. The electrical signal can include, for example, a varying voltage over time and/or a varying current over time depending, for example, the thickness and material of the electrode. The at least one microchannel can be in fluid communication with the at least one reservoir when the electrode covering the reservoir has at least partially electrodissolved. The amount of the drug released from the reservoir can then enter the at least one microchannel and spread through an entirety of the length of the microchannel due to, for example, a capillary force inside the microchannel and a diffusion coefficient of the drug in the water. The amount of the drug can then spread through an entirety of the length of the at least one microchannel based on, for example, convective flow. The drug diffuses into and through the entirety of the length of the at least one microchannel before diffusing out of the microchannel towards the eye (e.g., through a portion of the body of the ophthalmic device) because a rate of diffusion of the amount of the drug in the water of the at least one microchannel can be at least 100 times faster than a rate of diffusion of the amount of the drug in the body of the ophthalmic device.

At 76, a disorder of the eye can be treated in a uniform and/or a location patterned manner when the amount of the drug diffuses from a plurality of locations along the entirety of the length of the at least one microchannel towards and into the eye. The disorder of the eye can be, for example, glaucoma, dry eye, macular degeneration, retinopathy, or the like. In one example, the treating the disorder can include releasing the drug (via diffusion) at predetermined locations on the surface of the eye based on a shape and/or configuration of the microchannels. In another example treating the disorder can include having the drug diffuse uniformly from the plurality of locations along the entirety of the length of the at least one microchannel during a time period (e.g., the time it takes the drug to diffuse to the eye, such as 30 seconds, one minute, five minutes, 30 minutes or the like). Treatment can also include activating the release of another amount of a second drug from at least a second reservoir of the at least one reservoir a time after the first drug was actively released. For example, such a treatment can be a combinatorial treatment with different types of drugs configured to interacted and/or a treatment with two amounts (same or different) of the same drug type configured to prolong the dynamic therapeutic window without reaching toxic or subtherapeutic levels.

From the above description, those skilled in the art will perceive improvements, changes and modifications. Such improvements, changes and modifications are within the skill of one in the art and are intended to be covered by the appended claims.

What is claimed is:

1. A system comprising:
   an ophthalmic device configured to be positioned on a surface of an eye, wherein the ophthalmic device comprises a body, a side facing the eye, and an outward facing side;
   at least one reservoir encapsulated within the body of the ophthalmic device at a discrete location and configured to hold an amount of a drug, wherein each of the at least one reservoir is covered by an electrode configured to electrodissolve, wherein the amount of the drug is released from the at least one reservoir when the electrode electrodissolves; and
   at least one microchannel having a length and holding at least water and encapsulated in the ophthalmic device between the at least one reservoir and the side of the ophthalmic device facing the eye and configured to receive the amount of the drug after the amount of the drug is released from the at least one reservoir, wherein the amount of the drug spreads through an entirety of the length of the microchannel due to a capillary force inside the microchannel and a diffusion coefficient of the drug in the water before the amount of the drug diffuses out of the ophthalmic device to the eye,
   wherein the amount of the drug diffuses from a plurality of locations along the entirety of the length of the at least one microchannel towards the eye.

2. The system of claim 1, wherein the amount of the drug diffuses from the plurality of locations uniformly from the entirety of the at least one microchannel.

3. The system of claim 1, wherein the body comprises a hydrogel-based material.

4. The system of claim 1, wherein the capillary force inside the at least one microchannel pulls the drug into the at least one microchannel and spreads the drug across the at least one microchannel.

5. The system of claim 1, wherein the at least one microchannel comprises at least two hydrophilic coatings that gradually change and/or decreases the width and depth of the at least one microchannel to create the capillary force.

6. The system of claim 1, wherein the at least one microchannel is shaped and positioned within the ophthalmic device such that the amount of the drug diffuses to the eye in a predetermined pattern from the plurality of locations along the length of the entirety of the at least one microchannel.

7. The system of claim 6, wherein the ophthalmic device has an elliptical perimeter and the at least one microchannel is positioned to extend near and around the elliptical perimeter.

8. The system of claim 1, wherein the at least one microchannel extends in a lateral direction inside the body of the ophthalmic device.

9. The system of claim 1, wherein a rate of diffusion of the amount of the drug in the water of the at least one microchannel is at least 100 times faster than a rate of diffusion of the amount of the drug in the body of the ophthalmic device.

10. A method comprising:
    positioning an ophthalmic device on a surface of an eye, wherein the ophthalmic device comprises a body, an eye facing side, and an outward facing side, wherein the body encapsulates:
      a reservoir, at a discrete location, that is covered by an electrode and configured to hold an amount of a drug, and
      at least one microchannel that has a length and holds water, wherein the at least one microchannel is encapsulated in the ophthalmic device between the at least one reservoir and the side of the ophthalmic device facing the eye;
    activating release of the amount of the drug by electrodissolving the electrode, wherein the amount of the drug enters the at least one microchannel upon release from the reservoir and spreads through an entirety of the length of the microchannel due to a capillary force inside the microchannel and a diffusion coefficient of the drug in the water; and
    treating a disorder of the eye in a uniform and/or a location patterned manner when the amount of the drug diffuses from a plurality of locations along the entirety of the length of the at least one microchannel toward the eye.

11. The method of claim 10, wherein the treating a disorder of the eye in the location patterned manner further comprises releasing the drug at predetermined locations on the surface of the eye based on a shape of the microchannels.

12. The method of claim 10, wherein the drug diffuses uniformly from the plurality of locations along the entirety of the length of the at least one microchannel during a time period.

13. The method of claim 10, wherein the at least one microchannel is in fluid communication with the at least one reservoir when the electrode covering the reservoir has electrodissolved.

14. The method of claim 10, wherein the amount of the drug spreads through an entirety of the length of the at least one microchannel based on convective flow.

15. The method of claim 10, wherein a rate of diffusion of the amount of the drug in the water of the at least one microchannel is at least 100 times faster than a rate of diffusion of the amount of the drug in the body of the ophthalmic device.

16. The method of claim 10, wherein the drug spreads across the entirety of the length of the at least one microchannel before the drug diffuses from plurality of locations in the microchannels to the eye.

17. The method of claim 10, wherein the activating the release of the amount of the drug from the at least one reservoir further comprises:
   sending an electrical signal to the electrode cover to begin electrodissolution of the electrode,
   wherein the electrical signal comprises a varying voltage over time and/or a varying current over time.

18. The method of claim 10, further comprising activating the release of another amount of a second drug from at least a second reservoir of the at least one reservoir at a time after the activating the release of the drug.

19. The method of claim 10, wherein the treating a disorder of the eye in a uniform and/or a location patterned manner further comprises treating glaucoma.

20. The method of claim 10, wherein the treating a disorder of the eye in a uniform and/or location patterned manner further comprises treating dry eye.

* * * * *